United States Patent
Bendler et al.

(10) Patent No.: US 6,803,424 B2
(45) Date of Patent: Oct. 12, 2004

(54) PROCESS FOR CROSSLINKING OF ETHYLENE/ACRYLIC ESTER COPOLYMERS

(75) Inventors: Herbert Vernon Bendler, Wilmington, DE (US); Gordon Mark Cohen, Wynnewood, PA (US); Clara Young Lin, Hockessin, DE (US); Robert Louis Dawson, Wilmington, DE (US); Jerald Rice Harrell, Wilmington, DE (US); Sampson Chun Fai Lee, Scarborough (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/182,355

(22) PCT Filed: Mar. 2, 2001

(86) PCT No.: PCT/US01/06915

§ 371 (c)(1),
(2), (4) Date: Jul. 25, 2002

(87) PCT Pub. No.: WO01/74911

PCT Pub. Date: Oct. 11, 2001

(65) Prior Publication Data

US 2003/0023004 A1 Jan. 30, 2003

Related U.S. Application Data

(60) Provisional application No. 60/186,603, filed on Mar. 3, 2000.

(51) Int. Cl.$^7$ .................. C08F 118/04; C08F 222/10

(52) U.S. Cl. .................. 525/326.1; 526/318; 526/318.4; 526/319; 526/323.2; 526/324

(58) Field of Search .................. 525/326.1; 526/318, 526/318.4, 319, 323.2, 324, 308

(56) References Cited

U.S. PATENT DOCUMENTS

| 3,883,472 A | 5/1975 | Greene et al. |
| 3,904,588 A | 9/1975 | Greene |
| 4,399,263 A | 8/1983 | Brodoway |
| 5,093,429 A * | 3/1992 | Moteki et al. .............. 525/293 |
| 5,736,616 A | 4/1998 | Ching et al. |

FOREIGN PATENT DOCUMENTS

| DE | 3715027 | 11/1988 |
| JP | 62-121746 | 6/1987 |

OTHER PUBLICATIONS

Starmer, Philip H., Ethylene–Acrylic Elastomers, pp. 325–334, vol. 1, 1989.
H. Mark et al., Encyclopedia of Polymer Science and Engineering, McGraw–Hill Book Co., (1989), pp. 666–698, vol. 17, New York.

* cited by examiner

Primary Examiner—Robert D. Harlan

(57) ABSTRACT

Disclosed is a process for crosslinking copolymers of ethylene and acrylic esters by converting some of the ester groups to ester or amide groups which contain unsaturation, and then sulfur or peroxide curing the resulting polymers. The resulting crosslinked polymers often have excellent vulcanizate properties, and are useful especially in elastomeric form as seals and gasket.

29 Claims, No Drawings

PROCESS FOR CROSSLINKING OF ETHYLENE/ACRYLIC ESTER COPOLYMERS

This application claims the benefit of provisional application 60/186,603 filed Mar. 3, 2000.

FIELD OF THE INVENTION

Copolymers of ethylene and acrylic esters are crosslinked by converting some of the ester groups to ester or amide groups which contain unsaturation and then sulfur or peroxide curing the resulting polymers.

TECHNICAL BACKGROUND

Crosslinking (also sometimes termed vulcanization or curing) of polymers yields products which often have improved properties for their intended uses. This is particularly true when the polymer is an elastomer, and curing of elastomers is very commonly done, for instance using sulfur or peroxide curing. For sulfur cures, generally speaking the polymer contains olefinic unsaturation, while for peroxide curing the presence of olefinic unsaturation is often preferable, see for instance H. Mark, et al., Ed., Encyclopedia of Polymer Science and Engineering, Vol. 17, McGraw-Hill Book Co., New York, 1989, p. 666–698.

However, some types of elastomers do not contain olefinic unsaturation, and so are not generally sulfur cured, and/or cured by peroxides with some difficulty. These elastomers are cured using other curing systems. For example, elastomeric ethylene/acrylic copolymers may be crosslinked by the use of primary diamines, which form crosslinks, see for instance H. Mark, et al., Ed., Encyclopedia of Polymer Science and Engineering, Vol. 1, McGraw-Hill Book Co., New York, 1985, p. 325–334. In order to aid in such crosslinking to more readily form crosslinks and/or form more stable crosslinks curesite monomers, such as carboxylic acids or half acid esters may be copolymerized into the polymer, see for instance U.S. Pat. Nos. 3,883,472 and 3,904,588. However, it is often desirable to crosslink such polymers using sulfur or peroxide cures, because such cures are already in use in many factories for a wide variety of common elastomers, and/or the curing agents are less expensive and/or less toxic. In order to make such types of polymers peroxide and/or sulfur curable, it is desirable to introduce into them olefinic unsaturation containing groups. These groups should be introduced in such a way so as not to harm the basic polymer properties, so that the polymers may be readily and/or economically cured, and/or the resulting crosslinks are stable (so as to give good vulcanizate properties).

Japanese Patent Application 62-121746 describes the esterification of a polymer made from ethylene, an acrylic ester and maleic anhydride and/or a maleic half acid ester which is "modified" with an olefinically unsaturated amine or alcohol, and then cured using a sulfur or peroxide cure. No mention is made of polymers containing only ethylene and acrylic ester repeat units.

German Patent Application 3,715,027 A1 describes various copolymers of ethylene and acrylic acids and/or esters, and optionally other monomers such as maleic anhydride, their reaction with olefinic alcohols, including those with polyunsaturation, and their subsequent crosslinking by oxidation, e.g., reaction with air, often in the presence of an oxidation catalyst. The polymers are useful as thermosetting melt adhesives. No mention is made of sulfur or peroxide curing.

U.S. Pat. No. 5,736,616 is similar to German Patent Application 3,715,027, in that a polymer containing pendant unsaturation is used as an oxygen scavenger (react with oxygen). The polymer is made by polymerizing ethylene and acrylic esters and/or acids and then esterifying or transesterifying the resulting polymer with an unsaturated alcohol. No mention is made of curing such a polymer using a sulfur or peroxide cure.

U.S. Pat. No. 5,093,429 describes the preparation of a polymer containing olefinic unsaturation by direct copolymerization of ethylene, an acrylic ester, and a copolymerizable monomer containing unsaturation which survives the polymerization (for example has a copolymerizable double bond and a double bond which is unreactive in the polymerization), or by copolymerization of ethylene, and acrylic ester, and another copolymerizable monomer which may then be reacted with an unsaturated alcohol or amine to attach such unsaturation to the polymer. The polymer containing unsaturation may then be crosslinked using a sulfur or peroxide curing system. No mention is made of using the acrylic ester as a site to attach the olefinic unsaturation.

In some instances the crosslinks that result from curesite monomers present in some of the above references are not as stable as desired because linkages between the crosslinkable groups (e.g., olefinic unsaturation) are not as stable as desired (for example U.S. Pat. No. 4,399,263 mentions that at temperatures above 160° C. ethylene/alkyl acrylate/maleic acid ester polymers form anhydride moieties by internal reaction at the acid-ester curesite). The crosslinks may not be sufficiently stable because the curesite monomers and/or polymer-modifying reagents, which attach curable functionalities onto the polymer, introduce groups into the composition which catalyze unwanted reactions.

SUMMARY OF THE INVENTION

This invention concerns a process for crosslinking a polymer, comprising:

(a) transesterifying or amidating a first polymer consisting essentially of about 10 or more mole percent of ethylene, about 10 or more mole percent of

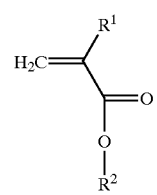

(I)

and up to about 10 mole percent, total, of one or more hydrocarbon olefins, with an alcohol or a primary amine which contains one or more olefinic bonds, to form a second polymer having side chains with said olefinic bonds; and (b) crosslinking said second polymer using a sulfur or peroxide cure system;

and wherein:

$R^1$ is methyl or hydrogen; and $R^2$ is hydrocarbyl or substituted hydrocarbyl.

Also disclosed herein is a composition comprising:

(a) a polymer made by transesterifying or amidating a first polymer consisting essentially of about 10 or more mole percent of ethylene, about 10 or more mole percent of

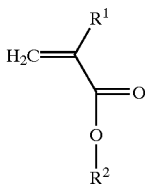

and up to about 10 mole percent, total, of one or more hydrocarbon olefins, with an alcohol or a primary amine which contains one or more olefinic bonds, to form a second polymer having side chains with said olefinic bonds; and (b) a sulfur or peroxide cure system;
and wherein:

$R^1$ is methyl or hydrogen; and $R^2$ is hydrocarbyl or substituted hydrocarbyl.

Another composition disclosed herein comprises:

(a) a polymer consisting essentially of about 10 or more mole percent of ethylene, about 10 or more mole percent of

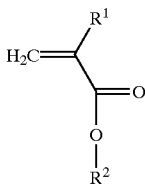

and up to about 10 mole percent, total, of one or more hydrocarbon olefins; and (b) a sulfur or peroxide cure system;
and wherein:

$R^1$ is methyl or hydrogen; and $R^2$ is hydrocarbyl or substituted hydrocarbyl, provided that at least 0.5 mole percent of $R^2$ contains olefinic unsaturation.

DETAILS OF THE INVENTION

Herein certain terms are used, and they are defined below.

By hydrocarbyl is meant a univalent radical containing only carbon and hydrogen. Unless otherwise specified it is preferred that it contain 1 to 30 carbon atoms.

By substituted hydrocarbyl is meant hydrocarbyl containing one or more substituents (functional groups) which do not interfere with (as appropriate) amidation, transesterification and crosslinking. Useful substituents include oxo (keto), halo, ether and thioether. Unless otherwise specified it is preferred that it contain 1 to 30 carbon atoms.

By a hydrocarbon olefin is meant a polymerizable olefin containing only carbon and hydrogen.

By olefinic double bond is meant a carbon-carbon double bond which is not part of an aromatic ring. Preferably the olefinic double bond has one or more allylic hydrogen atoms, particularly when a peroxide cure is used.

By an acrylic ester is meant a compound of formula (I).

By a dipolymer is meant a copolymer containing repeat units derived from two monomers.

By a sulfur cure system is meant any of the conventional known cure systems that cure unsaturated polymers using sulfur chemistry, see for instance H. Mark, et al., Encyclopedia of Polymer Science and Engineering, Vol. 17, McGraw-Hill Book Co., New York, 1989, p. 666–698, and W. Hoffmann, Vulcanization and Vulcanizing Agents, MacLaren & Sons, Ltd., London, 1967, both of which are hereby included by reference. The cure system may include conventional accelerators and other compounds, and may or may not have free sulfur present.

By a peroxide cure system is meant any of the conventional known cure systems that cure unsaturated polymers (they may also cure polymers containing no unsaturation) using organic peroxides, see for instance W. Hoffmann, Vulcanization and Vulcanizing Agents, MacLaren & Sons, Ltd., London, 1967, which is hereby included by reference. Besides the peroxide being present, other conventional ingredients such as so-called coagents may also be present.

By elastomeric or an elastomer is meant that the heat of fusion of any polymer crystallites present with a melting point (Tm) of 50° C. or more is less than 5 J/g, more preferably less than about 2 J/g, and preferably no polymeric crystallites are present at 25° C., and that the glass transition temperature (Tg) of the polymer is less than about 50° C., more preferably less than about 20° C., and especially preferably less than about 0° C. The Tm and heat of fusion of the polymer are determined by ASTM method D3451 at a heating rate of 10° C./min and the Tm is taken as the peak of the melting endotherm, while the Tg of the polymer is determined using ASTM Method E1356 at a heating rate of 10° C./min, taking the midpoint temperature as the Tg. Both of these are determined on a second heating of the polymer.

Preferably the first polymer used in the present invention is a dipolymer of ethylene and (I). In (I) it is preferred that $R^1$ is hydrogen and/or $R^2$ is hydrocarbyl, more preferably alkyl containing 1 to 6 carbon atoms, and especially preferably methyl [when $R^1$ is hydrogen and $R^2$ is methyl, (I) is methyl acrylate]. Also preferably the first polymer is elastomeric. A particularly preferred polymer is an ethylene/methyl acrylate dipolymer containing about 13 to about 46 mole percent of methyl acrylate.

Useful hydrocarbon olefins include styrene, α-methylstyrene, and substituted styrenes.

Useful alcohols which contain olefinic bonds include alcohols of the formula $H(CH_2)_pCH=CH(CH_2)_qCH_2OH$, (II), wherein p is 0 or an integer of 1 to 10, and q is 0 or an integer of 1 to 30, $HR^3(CR^4=CR^5R^6)_tCH_2OH$ (III) wherein $R^3$ and each $R^5$ are each independently a covalent bond, alkylene or alkylidene, and $R^4$ and $R^6$ are each independently hydrogen or alkyl, wherein (when applicable) $R^3$, $R^4$, $R^5$ and $R^6$ each independently contain 1 to 20 carbon atoms, and t is 1, 2 or 3. (II) is a preferred alcohol, and in (II) it is preferred that p is 0 and/or q is 5 to 17, or p is 8 and q is 7. It is preferred that these alcohols be primary or secondary alcohols, and more preferred that they be primary alcohols. Mixtures of alcohols may be used, for example a mixture of oleyl, linoleyl and linolenyl alcohols. Specific preferred alcohols include 10-undecen-1-ol, oleyl alcohol, cis-3,7-dimethyl-2,6-octadien-1-ol and 3-methyl-2-butenol.

Useful primary amines which contain olefinic bonds include amines of the formula $H(CH_2)_pCH=CH(CH_2)_qCH_2NH_2$, (IV), wherein p is 0 or an integer of 1 to 10, and q is 0 or an integer of 1 to 30, $HR^3(CR^4=CR^5R^6)_tCH_2NH_2$ (V) wherein $R^3$ and each $R^5$ are each independently a covalent bond, alkylene or alkylidene, and $R^4$ and $R^6$ are each independently hydrogen or alkyl, wherein (when applicable) $R^3$, $R^4$, $R^5$ and $R^6$ each independently contains 1 to 20 carbon atoms, and t is 1, 2 or 3. (IV) is a preferred primary amine, and in (IV) it is preferred that p is 0 and/or q is 5 to 17, or p is 8 and q is 7.

Since the reaction of the unsaturated alcohol or primary amine with the first polymer is usually run at elevated temperatures, and it is preferable that the alcohol or amine not be volatilized before it has a chance to react with the first polymer, it is preferred that the boiling point of this compound be high enough so that volatilization will be relatively slow. This of course means that the molecular weight of the amine or alcohol be such that the boiling point is relatively high. Thus it is preferred that the atmospheric boiling point (if necessary extrapolated from a boiling point at lower pressure) of the unsaturated primary amine or unsaturated alcohol be above the process temperature, more preferably at least about 50° above, for reaction of the first polymer [step (a)]. The olefinically unsaturated alcohol is a preferred reactant with the first polymer.

The first polymer is reacted with an olefinically unsaturated alcohol and/or primary amine to form a polymer in which the olefinically unsaturated alcohol and/or primary amine becomes a side chain on the polymer (forming the second polymer). If an alcohol is used, a transesterification takes place, replacing the —$OR^2$ group with a group derived from the alcohol (the alcohol minus the hydroxyl hydrogen atom). If a primary amine is used, an amidation takes place, replacing the —$OR^2$ group with a group derived from the primary amine (the primary amine minus one of the hydrogen atoms on the amino nitrogen atom). The total amount of alcohol and/or amine added to the reaction with the first polymer will depend upon the degree of transesterification and/or amidation desired and the percentage of alcohol and/or primary amine actually reacted with the first polymer. Typically this will range from 0.1 to 100 mole percent of the repeat units (I) present in the first polymer used, preferably 0.1 to about 50 mole percent, more preferably about 0.1 to about 35 mole percent, and especially preferably about 1 to about 20 mole percent of (I). To increase the rate of reaction, the amount of alcohol and/or amine added can exceed 100% of (I), but this may have other consequences (see below).

The reaction of the first polymer may be carried out at any temperature at which the transesterification and/or amidation takes place, a range of about 100° C. to about 350° C., preferably about 140° C. to about 280° C., and more preferably about 180° C. to about 260° C., being useful. The temperature should preferably not exceed a temperature at which significant decomposition of the polymer takes place. The temperature which is needed may be affected by the use of a catalyst for the transesterification or amidation reaction. Any of the catalysts conventionally useful for these reactions may be used, provided it does not stop the subsequent crosslinking of the polymer. For instance, known transesterification catalysts such as alkyl titanates, zinc acetate, alkali metal alkoxides, dibutyltin dilaurate, stannous octoate, butylstannoic acid, and (other) Ti, Sn, Zn, Mn and Pb compounds may be used. Some compounds such alkali metal alkoxides (see U.S. Pat. No. 5,656,692 for the use of this type of transesterification catalyst) may slow the crosslinking reaction. Preferred catalysts are tetralkyl titanates such as tetrabutyl titanate, and dibutyltin dilaurate. Typical amounts of catalyst may be used, for example 0.03 to 5 weight percent of the first polymer, more typically 0.1 to 2 weight percent of the first polymer. The catalyst may be dissolved in a small amount of an inert liquid compound or a portion of the olefinically unsaturated compound in order to mix it with the first polymer. Inert liquids include aromatic hydrocarbons such as xylene, 1,2,3,4-tetramethylbenzene, and isodurene, and chlorinated hydrocarbons such as o-dichlorobenzene. The use of these catalysts often reduces the temperatures and/or times required for the reaction to take place.

Since the transesterification reactions are equilibrium reactions to drive them to completion it may be preferable to remove the byproduct alcohol $R^2OH$ from the reaction. This can be done by allowing this (usually volatile) alcohol to volatilize. Vacuum may be applied and/or an inert gas sweep used to help remove this byproduct. An inert gas atmosphere may also help prevent discoloration and/or other degradation during the reaction.

The transesterification/amidation may be carried out in a variety of ways. To ensure complete mixing of the alcohol and/or amine and the first polymer all of these materials (and catalyst if present) may be dissolved in a solvent and the byproduct alcohol distilled from the solution. While this may be a good way of ensuring uniform reaction, dissolution of polymers and their recovery from solution is often an expensive process, so other methods may be desirable. One method is to heat the polymer while mixing it (at a temperature above its melting point and/or Tg, if any) in a polymer mixing apparatus. While the polymer is being kneaded by the mixer the alcohol and/or amine (and catalyst if used) may be added, and the mixing continued until the desired degree of reaction is achieved.

A more preferred method is a continuous process in which the first polymer, alcohol and/or amine, and catalyst (if present) are fed to, heated, mixed, and allowed to react in a single or twin screw extruder or similar apparatus. The screw configuration is preferably chosen to uniformly mix the various ingredients to ensure that a uniform second polymer is produced, and has one or more reaction zones that preferably retard the loss of unreacted olefinically unsaturated compound(s). The temperature and residence time in the extruder are such that the desired degree of reaction is obtained. In the extruder, vacuum sections or ports may be used to remove the byproduct alcohol $R^2OH$, and may also be used to remove unreacted olefinically unsaturated alcohol and/or primary amine from the product polymer at the exit end of the extruder. Typical residence times in an extruder are about 20 sec. to about 5 min, preferably 1 to 2 min, with additional residence time up to about 20 min (if desired) in heated pipes and/or melt pumps.

The second polymer is then cured using a conventional sulfur or peroxide cure for unsaturated (olefinic) polymers. The first polymer (before reaction) and/or the second polymer may contain other ingredients normally present in thermoplastics or elastomers, so long as they do not interfere with the amidation/transesterification if present in the first polymer or the curing if present in the second polymer. For example, large amounts of oils are usually not present when peroxide cures are employed, since they often slow down and/or interfere with the cure. These materials may include fillers/reinforcing agents such as carbon black, clay, talc, glass fiber and silica, pigments or coloring agents such as calcium sulfate and $TiO_2$, antioxidants, antioxonants, oils, plasticizers, release agents, etc. Peroxide cures often employ coagents such as triallyl iscyanurate or "HVA-2" (m-phenylene-bis-maleimide), trimethylolpropane trimethacrylate, trimethylolpropane acrylate, and triallyl cyanurate to speed the cure and/or improve the properties of the vulcanizate.

The crosslinked polymer produced by the process described herein is novel. Also novel are compositions containing the second polymer and a sulfur cure system or a peroxide cure system.

Blends of the first polymer and the second polymer may also be made and then cured using a sulfur or peroxide curing system, preferably a peroxide curing system. It is preferred that in such blends the second polymer is at least about 20 weight percent of the polymer present, based on the total amount of first and second polymers present. Surprisingly, even with the blend containing less of the olefinic unsaturated containing component, the polymers still cure rapidly and give vulcanizates with good properties.

Vulcanizates of the second polymer have good properties, but, similar to the product of all curing reactions these properties may vary depending on the cure used and the starting polymer composition. A good test for the stability of the crosslinks form is compression set at a given temperature. In this type of a test a (usually cured) polymer part is subjected to compression stress while being heated to a certain temperature. After a given period of time the stress is released, and the part cooled. The amount of the strain that the part does not recover is the compression set, and the lower the number the more stable the crosslinks are to rearrangement or simply being destroyed. This test is particularly important for parts that are to be used under compression, such as seals and gaskets.

It has been found that aside from the particular curing system used, the proportion of unreacted olefinically unsaturated alcohol and/or primary amine remaining in the second polymer and the absolute amount of reacted (present as side chains) olefinically unsaturated alcohol and/or primary amine present in the second polymer greatly affect the compression set. When the molar percentage (based on the total number of "moles" of reacted and unreacted olefinically unsaturated alcohol and primary amine present) of reacted olefinically unsaturated alcohol and primary amine present is relatively high the compression set is greatly improved (lower). Thus it is preferred that the second polymer contain more than about 70 mole percent, more preferably more than about 80 mole percent, especially preferably more than about 90 mole percent of reacted olefinically unsaturated alcohol and primary amine. This high level of reacted olefinically unsaturated alcohol and/or primary amine can be achieved by reacting most of the added alcohol and/or amine, and/or removing unreacted alcohol and/or amine. The latter can be done for example by subjecting the molten polymer to a vacuum, for instance a vacuum section in an extruder. These trends are illustrated in Examples 12–19 herein. For instance, in Example 12 there is only 6 mole percent of ungrafted alcohol in the polymer and the compression set is 73%, while in Example 15 there is 20 mole percent of ungrafted alcohol and the compression set is 80%. The proportions of reacted and unreacted alcohol and/or amine can be determined by NMR spectroscopy (see below).

It has also been found that if the first polymer is dried before being reacted with the olefinically unsaturated alcohol and/or amine that the amount of unreacted alcohol and/or amine in the second polymer is reduced. It is therefore preferred to dry the first polymer before this reaction. Before drying, the polymer may contain about 0.2 to 0.8% water. The polymer can be dried in a vacuum oven: overnight drying at 80° C., with a vacuum and slow nitrogen purge, can reduce the water content to about 0.01%, which can rise to about 0.05% after exposure to ambient conditions for a day or two. The polymer can also be dried by passing it through an extruder, without any other ingredients, while pulling a vacuum on vent ports placed over two or more of the extruder zones. The screw can be run at 200–250 rpm or any convenient speed, and the temperature profile adjusted so that the polymer's exit temperature is about 200° C. Under these conditions, the moisture content can be reduced to about 0.01–0.02%. The drying may also be accomplished at the back (feed) end of the extruder before introduction of the olefinically unsaturated compound and catalyst (if used). After heating the polymer in the first few zones of the extruder, the moisture is removed at a vent port, followed by a melt seal designed to separate the drying process from the transesterification or transamidation taking place in the next zones of the extruder. The melt seal can consist of a blister ring or reverse elements incorporated into the extruder screws.

In order to achieve good (low) compression set it has been found that a minimum level of reacted olefinically unsaturated alcohol and/or primary amine should be present in the second polymer. This is especially true when a sulfur cure system is used. Preferably there should be 30 mmol/100 g of second polymer or more, more preferably about 35 mmol/100 g of second polymer or more, of reacted olefinically unsaturated alcohol and/or primary amine present. A combination of low unreacted olefinically unsaturated alcohol and/or primary amine, and the minimum preferred amount of reacted olefinically unsaturated alcohol and/or primary amine often leads to the best (lowest) compression sets and/or fast cure rate.

In another preferred composition of the second polymer it is preferred that at least about 0.5 mole percent, preferably at least about 1.0 mole percent, and especially preferably at least about 2.0 mole percent of $R^2$ contain olefinic unsaturation.

In the Examples the following methods were used to test the polymer compositions.

| Property or Test | ASTM # | Specific Conditions |
|---|---|---|
| Mooney Viscosity | D1646 | Large Rotor; 100 C; 1 min preheat; 4 min test |
| Oscillating Disk Rheometer | D2084 | Monsanto ODR; Small Rotor; 1 deg arc |
| Rotorless Curemeter | D5289 | Alpha Technologies MDR-2000; 0.5 deg arc |
| Stress/Strain Properties | D412 | Die C Dumbbell |
| Hardness | D2240 | Durometer Type A |
| Compression Set | D395 | Method B |
| Tear | D624 | Die C Specimen |

In the examples, except for Examples 12–19 in which Henkel® 3317 or Henkel® 3318 were used, $^1H$ nmr spectra were measured with a 300 MHz GE spectrometer, in $CDCl_3$ as solvent, with tetramethylsilane as an internal standard. For the NMR analysis, the areas under peaks assigned to the unsaturated alcohol were compared with those under peaks assigned to the MA units of the E/MA. The relevant proton resonances for the MA units appeared at δ3.65 ppm (pendant $CH_3O$ moiety) and δ2.3 ppm (CHCOO moiety). Protons that resulted from the grafting of undecylenyl alcohol (for other alcohols analogous peaks and corrections would be used) appear at δ4.05 ppm ($CH_2OCO$ moiety linked to the polymer backbone). The vinyl $CH_2$=C protons at δ5.0 ppm belonged to the unsaturated alcohol, both before and after grafting. To determine the initial MA content from the 3.65 ppm peak, a correction was applied for loss of $CH_3O$ during reaction: in the absence of side-reaction, the loss at 3.65 ppm was equal to 1.5 times the peak that appeared at 4.05 ppm. Unless otherwise indicated, the average mole ratios of the attached ω-undecylenyl alcohol to initial MA was a direct average of the 4 ratios calculated by comparing the 5.0 ppm and 4.05 ppm peaks with the 2.3 ppm and corrected 3.65 ppm peaks. Similar methods would apply to using unsaturated amines.

Because the NMR peak areas suggested that there are slightly fewer protons at δ5.0 ppm than at δ4.05 ppm, there appeared to be little or no unreacted undecylenyl alcohol remaining in the products. In Examples 1–11, the alcohol may have been volatile enough to be driven off during the reaction and/or removed during polymer purification.

All reagents were used as received. ω-Undecylenyl alcohol (10-undecen-1-ol, 99%), titanium n-butoxide, 1,2,3,5-tetramethylbenzene and 1,2,3,4-tetra-methylbenzene were obtained from the Aldrich Chemical Company. o-Dichlorobenzene, methylene chloride ($CH_2Cl_2$), and methanol were obtained from EM Science. Isodurene (~90%) and, for the extruder experiment, 10-undecen-1-ol (~96%) were obtained from the Fluka Chemical Corporation. Poly (ethylene-co-methyl acrylate) dipolymers were obtained from the DuPont Company. The dipolymer with 62 wt % methyl acrylate (MA) and a melt index (190° C.) of about 25–40 g/10 min is designated E/62MA and another with 59 wt % MA and a melt index of ~8 is designated E/59MA. These copolymers can be made by methods described in U.S. Pat. Nos. 3,904,588 and 5,028,674.

In the Examples, the following abbreviations are used:

E—ethylene $E_B$—elongation (%) at break $M_{100}$—stress required to elongate specimen 100% (2 times original length of bench mark on dumbbell)

m/m—mol/mol (mole ratio)

MA—methyl acrylate

MDR—Rotorless Curemeter

ODR—Oscillating Disk Rheometer

ROH—olefinically unsaturated alcohol $T_B$—tensile strength at break

EXAMPLES 1–6

Equipment and Materials

Melt reactions were conducted batchwise in a Brabender Plasticorder® (C.W. Brabender Instruments, Inc., South Hackensack, N.J., U.S.A.) with a Type 6 Mixer/Measuring Head with roller blades (~60 ml cavity). Scale-up runs were also performed in a Brabender Plasticorder® equipped with a 3-piece Prep Mixer® and roller blades (~350 ml cavity). The typical total charge for the Type 6 was 50 g and for the larger mixer, 250 g. Continuous melt reactions were conducted in a twin-screw extruder described more completely in one of the examples.

Example 1

Grafting ω-Undecylenyl Alcohol Onto E/62MA at 200° C.

To a Type 6 Brabender mixer/measuring head at 200° C. and under nitrogen blanket, with roller blades turning at 75 rpm, were charged 45.0 g of E/62MA and 5.9 ml ω-undecylenyl alcohol (5.0 g at reported density, calculated mole ratio of ROH/MA=9.1%). After 2 min of mixing, 0.32 ml of 25% (w/w) titanium tetra-n-butoxide in o-dichlorobenzene (catalyst solution) was added gradually by syringe to the clear melt. Following catalyst addition, the Brabender torque rose gradually from 110 to 260 m-g. The mixer blades were stopped, the head disassembled, and the product discharged 13 min after beginning the catalyst addition. Part of the product (10.0 g) was dissolved in 50 ml of $CH_2Cl_2$, the solution precipitated in 250 ml of methanol in a blender. The precipitated solid was rinsed three times with 100-ml portions of methanol, each time kneaded in the presence of the liquid to improve extraction of impurities, and, after decanting, squeezed to expel the maximum possible liquid. The solid was dried overnight on polytetrafluoro-ethylene sheeting in the fume hood and then at RT in a vacuum oven for 24 h under vacuum and with nitrogen bleed. From this precipitated solid, 1 g was redissolved in 5 ml of $CH_2Cl_2$ and reprecipitated in 25 ml of methanol in a stirred beaker. The above rinsing and decanting procedure was repeated, and the solid also dried as above. Samples were analyzed by $^1$H NMR, designated 1-A (unpurified), 1-B (precipitated), and 1-C (reprecipitated). The analysis showed that the average fraction of methyl acrylate (MA) replaced by ω-undecylenyl alcohol was 5.9 (1-A), 5.4 (1-B), and 5.4% (1-C). This value was the mole ratio of attached alcohol to initial MA.

Example 2

Grafting ω-Undecylenyl Alcohol Onto E/62MA at 230° C.

The procedure of Example 1 was repeated except that the Brabender was heated to 230° C. Following catalyst addition, the Brabender torque rose rapidly from 50 to 330 m-g and then leveled off at 280 m-g. The average fraction of MA replaced by ω-undecylenyl alcohol was 6.3 (2-A), 5.8 (2-B), and 5.7% (2-C).

Example 3

Grafting ω-Undecylenyl Alcohol Onto E/62MA

To a Type 6 Brabender mixer/measuring head at 200° C. and under nitrogen blanket, with roller blades turning at 75 rpm, were charged 45.0 g of E/62MA and 5.9 ml ω-undecylenyl alcohol (5.0 g at reported density, calculated mole ratio of ROH/MA=9.1%). After 2 min of mixing, 0.42 ml of 25% (w/w) titanium tetra-n-butoxide in isodurene (catalyst solution) was added gradually by syringe to the clear melt. Following catalyst addition, the Brabender torque rose gradually from 80 to 170 m-g. The mixer blades were stopped, the head disassembled, and the product discharged 13 min after beginning the catalyst addition. Part of the product (5.0 g) was dissolved in 25 ml of $CH_2Cl_2$, the solution precipitated in 150 ml of methanol in a blender. The precipitated solid was rinsed three times with 50-ml portions of methanol, each time kneaded in the presence of the liquid to improve extraction of impurities, and, after decanting, squeezed to expel the maximum possible liquid. The solid was dried overnight on polytetrafluoro-ethylene sheeting in the fume hood and then at RT in a vacuum oven for 24 h under vacuum and with nitrogen bleed. The purified product was analyzed by $^1$H NMR, which showed that the average fraction of MA replaced by ω-undecylenyl alcohol was 6.4%.

Examples 4–6

Grafting ω-Undecylenyl Alcohol Onto E/62MA

To a Brabender Plasticorder® equipped with a 3-piece Prep Mixer® and roller blades at 200° C. and under nitrogen blanket, with roller blades turning at reduced speed were charged the E/MA and alcohol indicated in Table 1 (alcohol/MA=9.1 mol %). The speed of the roller blades was increased to 75 rpm. Because the temperature of the Brabender and contents fell during the charging of ingredients, mixing was allowed to continue until the temperature again rose to 200° C., in about 8–13 min. With the reactants at 200° C., 25% (w/w) titanium tetra-n-butoxide in 1,2,3,4-tetramethylbenzene (the catalyst solution indicated in Table 1) was added gradually, and the mixing was allowed to continue for an additional 13 min. Then the mixer blades were stopped, the head disassembled, and the product discharged. NMR analysis of the product indicated the average fraction of MA replaced by ω-undecylenyl alcohol, shown in Table 1.

TABLE 1

| Example | 4 | 5 | 6 |
|---|---|---|---|
| E/62MA, g | 225 | 225 | — |
| E/59MA, g | — | — | 225 |
| ω-undecylenyl alcohol, g | 25.1 | 25.0 | 24.1 |
| Catalyst Solution, ml | 2.1 | 2.1 | 1.1 |
| C = C/original MA (m/m), (δ5.0 vs. 3.65 & 2.3 ppm) | 7.2% | 6.2% | 9.4% |
| Grafted ROH/original MA (m/m), (δ4.05 vs. 3.65 & 2.3 ppm) | 8.4% | 6.6% | 8.3% |
| Overall average % MA replaced by alcohol | 7.8% | 6.4% | 8.8% |

The products obtained above, with pendant unsaturation, were compounded on a rubber mill and successfully cured with a sulfur-compound-based recipe. Compared with a similar polymer, composed of ethylene, methyl acrylate, and monoethyl maleate and cured with a diamine, the sulfur-cured polymers offered greater resistance to premature reaction ("scorch") and much faster cure. Tear strength was enhanced in comparison with a peroxide-cured ethylene-methyl acrylate dipolymer of very similar composition (Comparative Example A), as shown in Table 2. Curing and physical properties are summarized in Table 2. By 5/6 is meant a mixture of polymers from Examples 5 and 6.

TABLE 2

| Example | A | 4 | 5/6 | 6 |
|---|---|---|---|---|
| E/62MA | 100 | — | — | — |
| Polymer from Example 4 | — | 100 | — | — |
| Polymer from Example 5 | — | — | 85 | — |
| Polymer from Example 6 | — | — | 15 | 100 |
| Cure-system, type | peroxide[a] | sulfur[b] | sulfur[c,d] | Sulfur[b,d] |
| C = C cure-site concentration | | ~47 mmol/100 g | ~45 mmol/100 g | ~58 mmol/100 g |
| ODR, 30 min @ 160 C. Torque maximum, N · m | — | 4.8 | 4.7 | 5.6 |
| Torque, minimum, N · m | | 0 | 0.15 | |
| tc90, minutes | | 12.4 | 9.7 | |
| Hardness, Shore A | 60 | 66 | 67 | 71 |
| Tensile properties | | | | |
| $M_{100}$ (MPa) | 4.6 | 5.4 | 5.2 | 6.2 |
| $T_B$ (MPa) | 13.1 | 14.4 | 15.0 | 15.9 |
| $E_B$ (%) | 197 | 240 | 240 | 230 |
| Tear strength (kN/m) | 25 | 32 | — | — |
| Compression set, 70 hr @ 150° C. (%) | 22 | 88 | 66 | 82 |
| Compression set after post-cure, 70 hr @ 150° C. (%) | — | — | 50 | 52 |

[a]Rubber compound: elastomer (100), stearic acid (1.5), Naugard ® 445 (1), Vanfre ® VAM (0.5), SRF carbon black (60), Vulcup ® R (3.2), HVA-2 (2). Press Cure only: 20 min@177° C.
[b]Rubber compound: elastomer (100), zinc oxide (5), stearic acid (1), Naugard ® 445 (1), SRF Black (60), sulfur (1.5), MBT (0.5), Thionex ® (1.5). Press Cure only: 20 min @ 160° C.
[c]Rubber compound: elastomer (100), zinc oxide (5), stearic acid (1), Naugard ® 445 (1), SRF Black (60), sulfur (0.5), Thionex ® (1), Methyl Zimate (3), Butyl Zimate (3), Sulfasan ® R (1), TMTD (2.5). Press Cure: 20 min @ 160° C.
[d]One group of compression set pellets oven post-cured 4 hrs @ 160° C.

Examples 7–11

Continuous Extruder Graftin ω-Undecylenyl Alcohol Onto E/62MA

The following equipment was used for these Examples (a) A 5.1 cm (2") satellite single-screw extruder to feed E/MA elastomer.
(b) Berstorff® (Florence, Ky., U.S.A.) ZE-25 twin screw extruder, 25 mm diameter, L/D=38, co-rotating, intermeshing. A hard working screw design was employed, including blister rings, kneading, mixing and reverse elements. These elements created regions of hold-up (melt seals) at several places along the screw.
(c) two ISCO® (ISCO Inc., Lincoln, Nebr., U.S.A.) digital syringe pumps, model 500D, to feed ω-undecylenyl alcohol and catalyst solution
(d) Nash water ring vacuum pump, Model MVF15
(e) refrigerated cold trap working at –60° C.

The following materials were used:

| E/62MA | E. I. du Pont de Nemours and Company Wilmington, DE U.S.A. |
|---|---|
| 10-undecen-1-ol (ω-undecylenyl alcohol) | Supplier: Fluka Assay: 96% |
| titanium (IV) butoxide | Supplier: Aldrich Assay: 99% |
| 1,2,3,5 -tetramethylbenzene | Supplier: Aldrich Assay: 80% |

The E/MA polymer was fed at a controlled rate into the Berstorff extruder, the polymer at a temperature of about 100° C. at the point of injection into the Berstorff, Zone 0. The Berstorff extruder consisted of 7 zones, all heated at the same temperature specified in Table 3, and an eighth zone (the die) set at 200° C. The ω-undecylenyl alcohol was metered out by syringe pump and fed into zone 1 (at the input end) of the Berstorff extruder. Each day, a fresh batch of catalyst solution (25% w/w titanium [IV] n-butoxide in 1,2,3,5-tetramethylbenzene) was prepared and put into the ISCO syringe pump for delivery either to Zone 1 or Zone 4 of the Berstorff. A vent port was located at Zone 6. After a steady-state throughput was achieved, and prior to injecting alcohol and catalyst, the E/MA polymer flow-rate was checked by weighing the output of polymer over a 2-minute interval. The polymer exiting the die was collected in tared polytetrafluoroethylene-lined fry pans over measured time intervals (usually 2 min), cooled in a trough of cooling water, and weighed to determine product output rate. Occasionally throughout the experiment, polymer throughput was determined gravimetrically with the liquid streams turned off. By-product methanol and some of the unreacted ω-undecylenyl alcohol were removed near the output end of the Berstorff at a vacuum port on the extruder connected to the vacuum pump and cold trap described above.

The target throughput for E/MA was 60 g/min, which was measured prior to the introduction of liquids. At the end of the Examples an output of 58.7 g/min was measured, with the alcohol stream shut off. The residence time was about 1.2–1.5 min. This output was almost entirely E/MA, because of the low level of added catalyst and the volatility of the catalyst carrier solvent, which should ensure its removal at the vacuum port. The ω-undecylenyl alcohol was fed in at a rate of 7.86 ml/min. The Berstorff extruder screw speed was 205 rpm. Catalyst flow-rate and Berstorff barrel temperature were varied in the manner described in Table 3.

To calculate the average fraction of MA replaced by ω-undecylenyl alcohol, NMR analysis was performed in the manner described previously, but without using the vinyl proton peak at δ5.0 ppm. A base-line correction was applied to the product peak area at 4.05 ppm, by subtracting the corresponding area in the spectrum of a sample for which reaction did not appear to occur. The base-line corrected analysis is given in Table 3. In Table 4, the data is reported with and without application of the base-line correction. No correction was applied to the data reported for the blend in the first column of Table 4, which is equal to the sum of 85% of the grafted/original MA of Example 5 and 15% of the grafted/original MA of Example 6.

The products obtained from extruder-grafting of ω-undecylenyl alcohol, above, were compounded on a rubber mill with a sulfur-type curing recipe and vulcanized, the vulcanizate physical properties shown in Table 4. Except for the sample containing the fewest pendant vinyl groups, all tested samples could be sulfur-cured. Because their unsaturation level was lower than the grafts prepared in the Brabender Plasticorder®, they cured more slowly and gave a looser cross-link network, as evidenced by lower modulus, higher elongation at break, and higher compression set. The data demonstrates a good correlation between degree of unsaturation and both cure and physical properties.

TABLE 4

| Polymer of Example | 5 (85%) + 6 (15%)[b,c] | 8[a,c] | 9[a,c] | 11[a,c] | 7[a,c] |
|---|---|---|---|---|---|
| C=C cure-site concentration, mmol/100 g | ~45 | ~17 | ~14 | ~12 | ~7 |
| Average fraction of MA replaced by ω-undecylenyl alcohol, | | | | | |
| NMR, noise-corrected | | 2.4% | 1.8% | 1.6% | 1.0% |
| NMR, not noise-corrected | 6.9% | 2.9 | 2.4 | 2.1% | 1.4% |
| Cure-rate: ODR, 30 min @ 160° C. | | | | | |
| torque minimum, N m | 0.15 | 0.11 | 0.11 | 0.11 | 0.08 |
| $t_{s2}$, minutes | 4.0 | 5.3 | 8.6 | 8.4 | — |
| torque maximum, N m | 4.7 | 2.5 | 1.3 | 1.5 | 0.18 |
| $t_c90$, minutes | 9.7 | 10.1 | 11.7 | 11.8 | No Cure |
| Hardness, Shore A | 67 | 66 | 62 | 64 | No cure |
| Tensile properties, original | | | | | |
| $M_{100}$ (MPa) | 5.2 | 4.8 | 3.3 | 3.3 | No cure |
| $T_B$ (MPa) | 15.0 | 15.0 | 13.1 | 13.5 | No cure |
| $E_B$ (%) | 240 | 322 | 432 | 428 | No cure |
| Heat-aged 2 wk @ 150° C. | | | | | |
| $M_{100}$ (MPa) | — | 16.4 | 12.8 | 13.0 | No cure |
| $T_B$ (MPa) | 17.0 | 19.4 | 16.6 | 16.2 | No cure |
| $E_B$ (%) | 98 | 138 | 159 | 142 | No cure |
| Compression set, 70 hr @ 150° C. (% set) | 50 | 89 | 92 | 93 | No cure |

[a]Press Cure: 20 min @ 160° C.; post-cure @ 160° C.: 4.5 hrs for slabs, 4 hrs for compression set pellets
[b]Press Cure: 20 min @ 160° C.; post-cure for compression set pellets: 4 hrs @ 160° C.
[c]Rubber compound: elastomer (100), zinc oxide (5), stearic acid (1), Naugard® 445 (1), SRF Black (60), Methyl Zimate (3), Butyl Zimate (3), Sulfasan® R (1), sulfur (0.5), Thionex® (1), TMTD (2.5).

TABLE 3

| Example | 7 | 8 | 9 | 10 | 11 |
|---|---|---|---|---|---|
| Set temperature, Zones 1–7 | 220° C. | 240° C. | 240° C. | 220° C. | 240° C. |
| Catalyst injection zone | 1 | 1 | 4 | 4 | 4 |
| Catalyst feed (ml/min) | 3.6 | 3.6 | 1.2 | 3.6 | 1.5 |
| Total output (g/min) | 66.5 | 66 | 62.5 | 60 | ~66 |
| Extruder amps | 5 | 5 | 5 | 5 | — |
| Discharge pressure (kPa) | 350 | 550 | 590 | 690 | 660 |
| Average fraction of MA replaced by ω-undecylenyl alcohol, with baseline correction | 1.0% | 2.4% | 1.8% | 2.4% | 1.6% |

Some of the products obtained from extruder-grafting of ω-undecylenyl alcohol, above, were compounded on a rubber mill with a peroxide-type curing recipe and vulcanized; the vulcanizate physical properties are shown in Table 5. As shown by the ODR data, the unsaturation grafted onto the E/MA led to faster peroxide vulcanization than the dipolymer control which contains no unsaturation. The grafted E/MA also attained a higher state of cure as shown by the final ODR torque when curing was complete. Vulcanizate compression set resistance of the grafted E/MA was also improved relative to the control.

Curing conditions are the same for compound in Tables 5 and 6, compression molding for slabs and pellets—15 min at 177° C., and oven post cure for one group of compression set pellets—4 at 177° C.

TABLE 5[a]

| E/62MA Dipolymer[b] | 100.0 | — | — | 50.0 |
| Polymer from Example 10 | — | 100.0 | — | — |

TABLE 5$^a$-continued

| | | | | |
|---|---|---|---|---|
| Polymer from Example 11 | | | 100.0 | 50.0 |
| Mooney Viscosity, 100° C., ML-4 | 11.6 | 11.0 | 10.9 | 11.4 |
| ODR Cure, 177° C., Torque, dNm | | | | |
| 2.5 min | | 1.9 | 14.7 | 7.1 | 4.4 |
| 5 min | | 4.6 | 41.8 | 27.5 | 16.3 |
| 10 min | | 8.0 | 58.9 | 43.2 | 27.2 |
| 20 min | | 9.5 | 63.3 | 47.8 | 31.0 |
| 30 min | | 9.5 | 63.6 | 48.4 | 31.4 |
| Maximum Cure rate, dNm/min | | 1.1 | 13.6 | 9.0 | 5.0 |
| Stress-strain,$^c$ original, 25° C. | | | | | |
| 100% modulus, Mpa | | 2.2 | 13.0 | 9.3 | 5.6 |
| Tensile strength at break, MPa | | 10.2 | 14.6 | 14.3 | 13.7 |
| Elongation at break | | 430% | 107% | 136% | 189% |
| Shore Hardness,$^c$ A | | 68 | 71 | 75 | 72 |
| Compression set, method B, 70 hr/150° C. | | | | | |
| Press cure (15 min/177° C.) | | 45% | 21% | 30% | 31% |
| Press + post-cure (4 hr/177° C.) | | 30% | 11% | 14% | 14% |

$^a$Compound contains (by wt): elastomers (100.0), Vanfre ® VAM (0.5), Armeen ® 18D (0.5), stearic acid (1.5), Naugard ® 445 (1.0), SRF Black, N-774 (65.0), TP-759 (5.0), Vulcup ® R (2.5), HVA-2 (1.0)
$^b$Nominal melt index = 40
$^c$Samples press cured 15 min at 177° C.

Surprisingly, it is found that the substantial improvement in set is retained even in compounds that are based on blends of polymer grafted with unsaturation and virgin polymer that contains no grafted unsaturation, shown in Table 6. This is also shown by the last column in Table 5.

TABLE 6$^a$

| | | | | | |
|---|---|---|---|---|---|
| E/62MA Dipolymer$^b$ | 100.0 | — | 50.0 | 62.5 | 75.0 |
| Polymer of Example 11 | — | 100 | 50.0 | 37.5 | 25.0 |
| Average fraction of MA replaced by ω-undecylenyl alcohol, with baseline correction | 0 | 1.6% | 1.6% | 1.6% | 1.6% |
| Mooney Viscosity, 100° C., ML-4 | 10.7 | 10.9 | 12.1 | 13.0 | 17.4 |
| ODR Cure, 177° C. Torque, dNm | | | | | |
| 2.5 min | 3.4 | 7.1 | 7.3 | 6.8 | 4.5 |
| 5 min | 8.7 | 27.5 | 20.8 | 18.0 | 14.7 |
| 10 min | 12.9 | 43.2 | 31.1 | 26.6 | 22.4 |
| 20 min | 14.1 | 47.8 | 33.9 | 29.3 | 24.9 |
| 30 min | 14.0 | 48.4 | 34.2 | 29.4 | 24.9 |
| Stress-strain$^c$, original, 25° C. | | | | | |
| 100% modulus, MPa | 1.8 | 9.3 | 5.1 | 4.5 | 3.5 |
| 200% modulus, MPa | 4.5 | — | 14.9 | 12.6 | 9.8 |
| Tensile strength at break, MPa | 10.4 | 14.3 | 14.5 | 13.2 | 12.3 |
| Elongation at break | 442% | 136% | 199% | 208% | 243% |
| Shore Hardness$^c$, A | 66 | 75 | 71 | 63 | 64 |
| Compression set, method B, 70 hr/150° C. | | | | | |
| Press cure (15 min/177° C.) | 48% | 30% | 32% | 29% | 41% |
| Press + post-cure (4 hr/177° C.) | 30% | 14% | 14% | 16% | 14% |

$^a$Compound contains (by wt): elastomers (100.0), Vanfre ® VAM (0.5), Armeen ® 18D (0.5), stearic acid (1.5), Naugard ® 445 (1.0), SRF Black, N-774 (65.0), TP-759 (5.0), Vulcup ® R (2.5), HVA-2 (1.0)
$^b$Nominal melt index = 40
$^c$Samples press cured 15 min at 177° C.

Examples 12–19
Continuous Extruder Grafting of Commercial Oleyl Alcohol Onto E/62MA The procedure described in Examples 7–11 was followed except that a commercial grade of oleyl alcohol was used as grafting agent in place of ω-undecylenyl alcohol. The oleyl alcohol, obtained from the Henkel Corporation and known as Henkel® 3317 or HD Ocenol® 90/95, was approximately 90% pure, the balance being saturated long-chain alcohols. The zones were defined differently in these examples, with the polymer feed zone designated '1' instead of the '0' reported in previous examples. Thus, the polymer was fed to zone 1, the alcohol to zone 2, and the catalyst solution to the zone specified in Table 7. The vent port was at zone 7.

The target throughput for E/62MA was 60 g/ min, which was measured prior to the introduction of liquids, and found to be 62–65 g/min at various points during the run. The Henkel® 3317 was fed in at a rate of 12.6 ml/min. Extruder screw speed was 190–200 rpm. Catalyst flow-rate and Berstorff barrel temperature were varied in the manner described in Table 7. Example 15 differed from the rest in that the catalyst consisted of a 12.3% (w/w) solution of titanium [IV] n-butoxide in Henkel® 3317, fed at 4.8 ml/min, and the separate Henkel® 3317 alcohol feed was reduced to 8.3 ml/min (to mix approximately the same amount of unsaturated alcohol into E/62MA as in the other examples). Since the commercial alcohol contained 90% oleyl alcohol, its only unsaturated constituent, the amount of MA replaced by unsaturated alcohol was calculated to be 90% of the total amount of MA replaced by Henkel® 3317, as shown in Table 7. Because the long-chain alcohols were relatively non-volatile, some were retained in the polymer even if not grafted.

The fraction of MA replaced by Henkel® 3317 and ratio of grafted to total alcohol in the product that are reported in Table 7 were obtained from the proton NMR data and calculations given in Table 8. The NMR spectra were measured with a 400 MHz spectrometer (Bruker AM-400). The mol % of all the alcohol in the sample, relative to MA (Column F), was calculated from the vinyl protons at δ5.3 ppm (that represent the grafted and ungrafted unsaturated alcohol in the sample) and the methine protons at δ2.3 ppm (that represents the starting MA content of the E/62MA). Because NMR analysis had shown that Henkel® 3317 contained 90% unsaturated oleyl alcohol, a correction factor was applied to determine the total alcohol content, both saturated and unsaturated. Instead of dividing the peak area of column B by 2 to obtain the relative number of moles of total alcohol, it was divided by 2×0.90=1.8. NMR analysis had also shown that some of MA's methine proton had been consumed during the manufacture of E/62MA—the peak area at δ2.3 ppm measured 0.92, instead of 1.00, relative to the 3.0 for MA's methyl ester peak at δ3.6 ppm. Therefore a second correction was applied, dividing the peak area of column E by 0.92 rather than 1.00 to obtain the relative number of moles of MA prior to the reaction. Thus, the mol % of all the alcohol in the sample, relative to MA (Column F), was (100%×Column B/1.8)/(Column E/0.92).

The fraction of MA replaced by all the alcohols in Henkel® 3317 (Column G) was determined by comparing the CH$_2$ ester protons that resulted from the grafting of the alcohol, at δ4.0 ppm, with MA's CH$_3$ ester peaks at δ3.6 ppm. To determine the initial MA content from the δ3.6 ppm peak, a correction was applied for loss of CH$_3$ during the transesterification reaction, which is equal to 1.5 times the number of CH$_2$ ester protons created. Thus, the mol % of replaced MA (Column G) was (100%×Column C/2)/(Column C×1.5/3+Column D/3). The fraction of MA replaced by all the alcohols in Henkel® 3317 in Column H was determined by a second method, comparing the CH$_2$ ester protons that resulted from the grafting of the alcohol, at δ4.0 ppm, with MA's CH peak at δ2.3 ppm. The same correction was applied for the loss of CH during manufacture of E/62MA, as described above. Thus, the mol % of replaced MA (Column H) was (100%×Column C/2)/(Column E/0.92). The ratio of grafted/total alcohol in the extruder product (Column I) was determined by comparing the fraction of MA replaced by alcohol with the amount of total alcohol relative to MA. Thus, this ratio was (100%× Column H/Column F).

TABLE 7

| Example | 12 | 13 | 14 | 15 |
|---|---|---|---|---|
| Set temperature, Zones 1–7 | 260° C. | 240° C. | 260° C. | 260° C. |
| Catalyst injection zone | 3 | 5 | 5 | 3 |
| Catalyst feed (ml/min) | 2.4 | 2.4 | 2.4 | 4.8 |
| Total output (g/min) | 74.0 | 72.5 | 69.0 | 72.5 |
| Extruder amps | 5.5 | 5.5 | 5.5 | 5.5 |
| Discharge pressure (kPa) | 350–410 | 480 | 480–690 | 280 |
| Average fraction of MA replaced by Henkel ® 3317 (grafted) | 5.6% | 6.0% | 6.7% | 6.4% |
| Average fraction of MA replaced by unsaturated alcohol component of Henkel ® 3317 (grafted) | 5.0% | 5.4% | 6.1% | 5.8% |
| Grafted/total alcohol in sample | 94% | 90% | 93% | 84% |

40% oleyl alcohol, the balance made up of saturated long-chain alcohols. The grafting results are given in Table 9. Since Henkel® 3317 or 3318 contains 85% unsaturated alcohols, the amount of MA replaced by unsaturated alcohols was calculated to be 85% of the total amount of MA replaced by Henkel® 3318, as shown in Table 9.

TABLE 9

| Example | 16 | 17 | 18 | 19 |
|---|---|---|---|---|
| Alcohol grafting agent | Henkel ® 3317 | Henkel ® 3317 | Henkel ® 3318 | Henkel ® 3318 |
| Average fraction of MA replaced by Henkel ® 3317 or 3318 | 6.8% | 6.0% | 6.0% | 6.5% |
| Average fraction of MA replaced by unsaturated alcohol component of Henkel ® 3317 or 3318 | 6.1% | 5.4% | 5.1% | 5.5% |
| Grafted/total alcohol in sample | 92% | 87 | 82% | 78% |

TABLE 8

| Column A Example | Column B Total Henkel ® 3317 (vinyl protons) | Column C Grafted Henkel ® 3317 (ester CH$_2$ protons) | Column D MA (ester CH$_3$ protons) | Column E MA (CH proton) | Column F Total Henkel ® 3317/MA, mol % | Column G Fraction of MA replaced by Henkel ® 3317 (grafted), 1 | Column H Fraction of MA replaced by Henkel ® 3317 (grafted), 2 | Column I Grafted Total Henkel ® 3317 in sample |
|---|---|---|---|---|---|---|---|---|
| | CH$_2$ = δ5.3 ppm* | CH$_2$OC δ4.0 ppm* | CH$_3$OC δ3.6 ppm* | CH δ2.3 ppm* | | | | |
| | | PEAK AREAS | | | | | | |
| 12 | 789 | 823 | 21134 | 6622 | 6.09 | 5.52 | 5.72 | 93.9 |
| 13 | 829 | 831 | 19545 | 6319 | 6.71 | 6.00 | 6.05 | 90.2 |
| 14 | 1038 | 1077 | 22485 | 7286 | 7.28 | 6.70 | 6.80 | 93.4 |
| 15 | 872 | 809 | 17888 | 5763 | 7.73 | 6.35 | 6.46 | 83.5 |

*Peak position, relative to tetramethylsilane at 0 ppm.

Additional graft materials were prepared in the same extruder in a similar manner, using Henkel® 3317 or 3318 as grafting agents. Henkel® 3318, also known as HD Ocenol® 110/130 is another unsaturated alcohol that contains about 35% linoleyl alcohol, 10% linolenyl alcohol, and The grafted polymers from Tables 7 and 9 were vulcanized with a sulfur cure system, and selected curing and physical properties shown in Table 10.

TABLE 10[a,b]

| Polymer of Example | 12 | 13 | 14 | 15 | 16 | 17 | 18 | 19 |
|---|---|---|---|---|---|---|---|---|
| MDR, 30 min @ 160° C. | | | | | | | | |
| Torque, minimum, Nm | 0.05 | 0.02 | 0.02 | 0.02 | 0.02 | 0.02 | 0.02 | 0.02 |
| Torque, maximum, Nm | 1.34 | 1.50 | 1.38 | 1.29 | 1.56 | 1.25 | 1.03 | 1.18 |
| Tc90, minutes:seconds | 7:18 | 7:31 | 7:35 | 7:50 | 7:41 | 8:01 | 8:12 | 8:87 |
| Hardness, Shore A | 61 | 62.5 | 60.5 | 59 | 62.5 | 61.0 | 62.5 | 60.0 |
| Tensile strength at break, Mpa | 12.4 | 12.0 | 13.0 | 11.3 | 13.4 | 12.1 | 14.4 | 13.3 |
| Elongation at break, % | 277 | 247 | 237 | 253 | 267 | 287 | 347 | 270 |

TABLE 10[a,b]-continued

| Polymer of Example | 12 | 13 | 14 | 15 | 16 | 17 | 18 | 19 |
|---|---|---|---|---|---|---|---|---|
| Compression Set, % | | | | | | | | |
| 70 hours/150° C.[c] | 73.3 | 69.7 | 72.9 | 80.2 | 69.1 | 77.6 | 80.6 | 81.7 |
| Tear Strength, Die C, 125° C. | | | | | | | | |
| N/mm | 7.35 | 7.71 | 9.46 | 8.76 | 9.28 | 9.81 | 11.73 | 10.33 |

[a]Sulfur curing recipe: elastomer (100), zinc oxide (5), stearic acid (1), Naugard ® 445 (1), SRF Black (60), Methyl Zimate (3), Butyl Zimate (3), Sulfasan ® R (1), sulfur (0.5), Thionex ® (1), TMTD (2.5).
[b]Press Cure: 20 minutes @ 160° C.; Oven Post Cure: 4 hours @ 160° C.
[c]Test conditions for Compression Set

What is claimed is:

1. A process for crosslinking a polymer, comprising:
   (a) transesterifying or amidating a first polymer consisting essentially of about 10 or more mole percent of ethylene, about 10 or more mole percent of

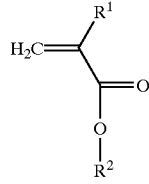

(I)

and up to a total of about 10 mole percent of one or more hydrocarbon olefins, with an alcohol or a primary amine which contains one or more olefinic bonds, to form a second polymer having side chains with said olefinic bonds; and
   (b) crosslinking said second polymer using a sulfur or peroxide cure system;
and wherein:
   $R^1$ is methyl or hydrogen; and
   $R^2$ is hydrocarbyl or substituted hydrocarbyl.

2. The process as recited in claim 1 wherein said first polymer is an elastomer.

3. The process as recited in claim 2 wherein each $R^2$ is independently alkyl containing 1 to 6 carbon atoms.

4. The process as recited in claim 2 wherein $R^2$ is methyl.

5. The process as recited in claim 2 wherein said first polymer is ethylene/methyl acrylate dipolymer.

6. The process as recited in claim 2 wherein said first polymer is ethylene/alkyl acrylate copolymer, wherein each alkyl contains 1 to 6 carbon atoms.

7. The process as recited in claim 1, 2 or 5 wherein a transesterification is carried out.

8. The process as recited in claim 7 wherein a transesterification catalyst is present.

9. The process as recited in claim 8 wherein said catalyst is a tetraalkyl titanate or a tin compound.

10. The process as recited in claim 7 wherein said alcohol has the formula $HR^3(CR^4\!=\!CR^5R^6)_tCH_2OH$ (III) wherein $R^3$ and each $R^5$ are each independently a covalent bond, alkylene or alkylidene, and $R^4$ and $R^6$ are each independently hydrogen or alkyl, and t is 1, 2 or 3.

11. The process as recited in claim 7 wherein said alcohol is one or more of oleyl, linoleyl or linolenyl alcohols.

12. The process as recited in claim 1 wherein during (b) said first polymer is also present, provided that said second polymer is at least 20% by weight of a total of said first polymer and said second polymer.

13. A composition comprising:
   (a) a polymer made by transesterifying or amidating a first polymer consisting essentially of about 10 or more mole percent of ethylene, about 10 or more mole percent of

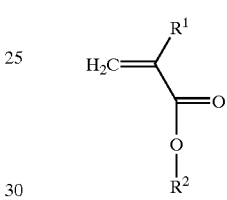

(I)

and up to a total of about 10 mole percent of one or more hydrocarbon olefins; with an alcohol or a primary amine which contains one or more olefinic bonds, to form a second polymer having side chains with said olefinic bonds; and (b) a sulfur or peroxide cure system;

and wherein:

$R^1$ is methyl or hydrogen; and $R^2$ is hydrocarbyl or substituted hydrocarbyl.

14. The composition as recited in claim 13 wherein said polymer is an elastomer.

15. The composition as recited in claim 14 wherein each $R^2$ is independently alkyl containing 1 to 6 carbon atoms.

16. The composition as recited in claim 14 wherein $R^2$ is methyl.

17. The composition as recited in claim 14 wherein said first polymer is ethylene/alkyl acrylate copolymer, wherein each alkyl contains 1 to 6 carbon atoms.

18. The composition as recited in claim 14 wherein said polymer is an ethylene/methyl acrylate dipolymer.

19. The composition as recited in claim 13 wherein said first polymer is also present, provided that said second polymer is at least 20% by weight of a total of said first polymer and said second polymer.

20. A composition comprising:
   (a) a polymer consisting essentially of about 10 or more mole percent of ethylene, about 10 or more mole percent of

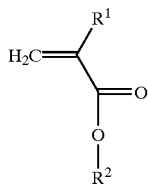

(I)

and up to a total of about 10 mole percent of one or more hydrocarbon olefins; and (b) a sulfur or peroxide cure system;
and wherein:

R¹ is methyl or hydrogen; and

R² is hydrocarbyl or substituted hydrocarbyl, provided that at least 0.5 mole percent of R² contains olefinic unsaturation.

21. The composition as recited in claim 20 wherein said polymer is an elastomer.

22. The composition as recited in claim 21 wherein each R² which does not contain unsaturation is independently alkyl containing 1 to 6 carbon atoms.

23. The composition as recited in claim 21 wherein R² which does not contain unsaturation is methyl.

24. The composition as recited in claim 22 said polymer is a copolymer of ethylene and (I) only, wherein R² which does not contain unsaturation is methyl.

25. The composition as recited in claim 20 wherein a second polymer is also present, provided that said first polymer is at least 20% by weight of a total of said first polymer and said second polymer, and said second polymer consisting essentially of about 10 or more mole percent of ethylene, about 10 or more mole percent of

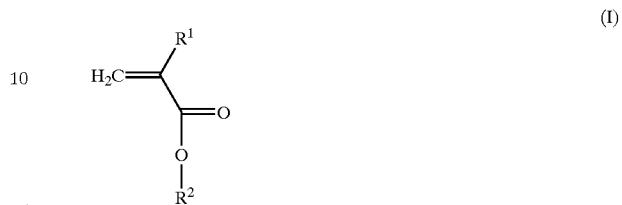

(I)

and up to a total of about 10 mole percent of one or more hydrocarbon olefins, wherein:

R¹ is methyl or hydrogen; and

R² is hydrocarbyl or substituted hydrocarbyl, provided that at least none of R² contains olefinic unsaturation.

26. The product of the process of claim 1.

27. The product of the process of claim 7.

28. The process as recited in claim 1 wherein said first polymer is dried before step (a).

29. The process as recited in claim 7 wherein said first polymer is dried before step (a).

* * * * *